July 6, 1954  G. K. NEWELL  2,682,885
SELF-LAPPING FLUID PRESSURE CONTROL MECHANISM
Filed Jan. 30, 1951  4 Sheets-Sheet 1

INVENTOR.
George K. Newell
BY
Frank E. Miller
ATTORNEY

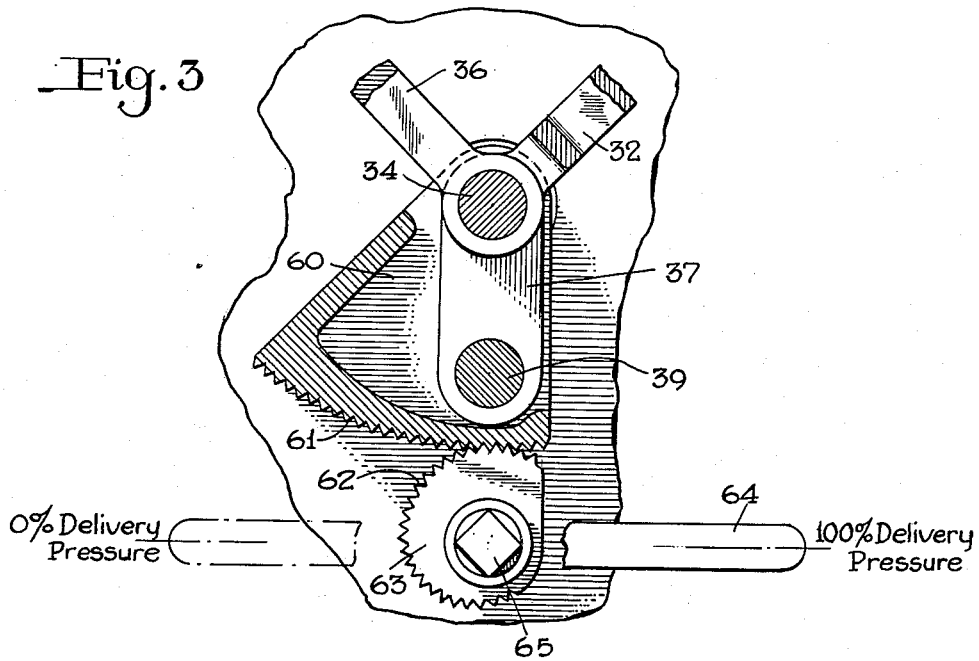
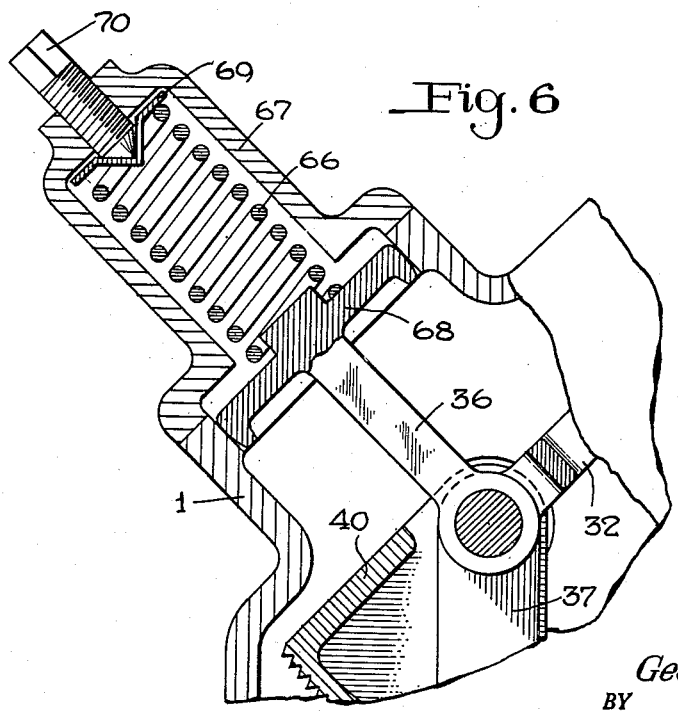

INVENTOR.
George K. Newell
BY
ATTORNEY

July 6, 1954  G. K. NEWELL  2,682,885
SELF-LAPPING FLUID PRESSURE CONTROL MECHANISM
Filed Jan. 30, 1951  4 Sheets-Sheet 4

INVENTOR.
George K. Newell
BY
Frank E. Miller.
ATTORNEY

Patented July 6, 1954

2,682,885

UNITED STATES PATENT OFFICE 2,682,885

SELF-LAPPING FLUID PRESSURE CONTROL MECHANISM

George K. Newell, near Pitcairn, Pa., assignor to Westinghouse Air Brake Company, a corporation of Pennsylvania Application January 30, 1951, Serial No. 208,500

4 Claims. (Cl. 137—102)

1

This invention relates to a fluid pressure control mechanism and more particularly to a mechanism of the self-lapping type.

One object of the invention is the provision of an improved mechanism of the above type.

Another object of the invention is the provision of a mechanism of the above type which is adjustable to vary the ratio between a controlling force, such as fluid pressure, or spring pressure, and the pressure of fluid to be controlled for operating a device.

Another object of the invention is the provision of a mechanism of the above type which may be easily and accurately adjusted to vary the aforesaid ratio while subjected to operating pressures.

To attain these objects a mechanism is provided in which three forces are normally held in equilibrium, two of these forces being variable forces established by individual diaphragm assemblages disposed axially at a substantially fixed angle to each other so that the direction of these forces are also at a substantially fixed angle relative to each other. The third force is a reactive force opposing the resultant of the other two forces through the medium of a yoke or support member, the position of which may be varied to vary the direction of action of the third force and therefore its angular relation to the other two forces. Hence, if one of the two forces has a constant magnitude and the direction of the third force is varied, then the magnitude of the second force must also vary in order to reestablish equilibrium. Also, for the same reason, if the first force is varied, the corresponding magnitude of the second force will be varied an amount dependent upon the direction of the third force, as will appear more fully later.

Other objects and advantages will be apparent from the following more detailed description of the invention.

Figure 1:
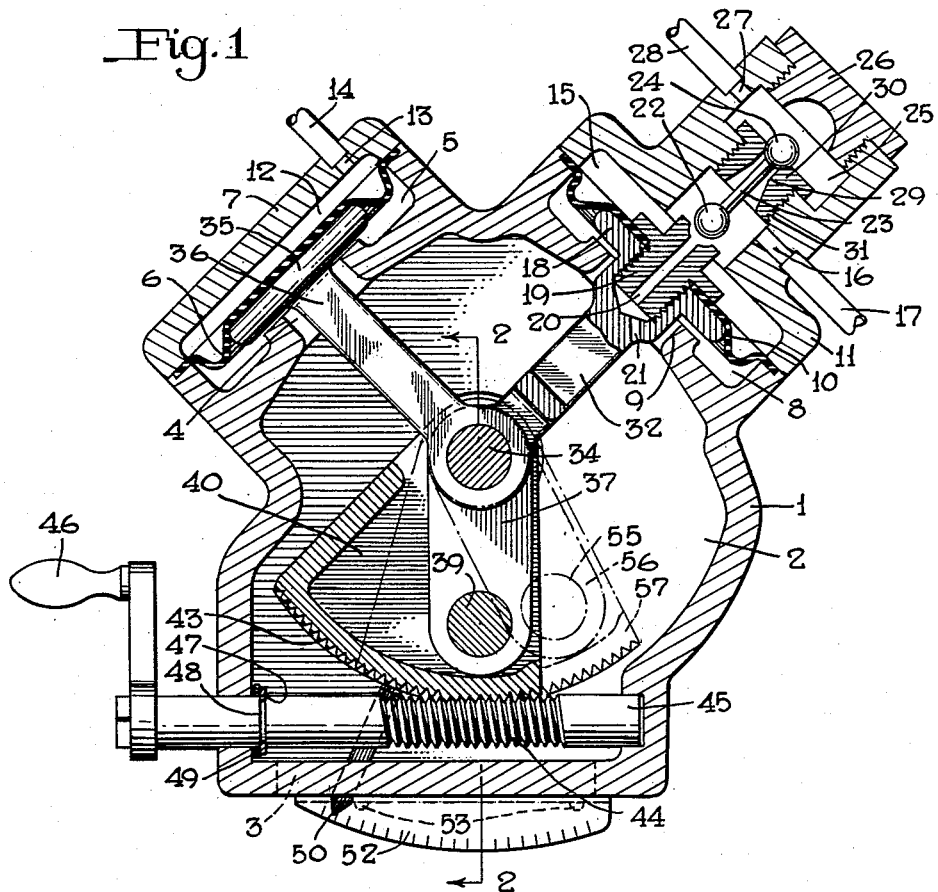
Figure 2:
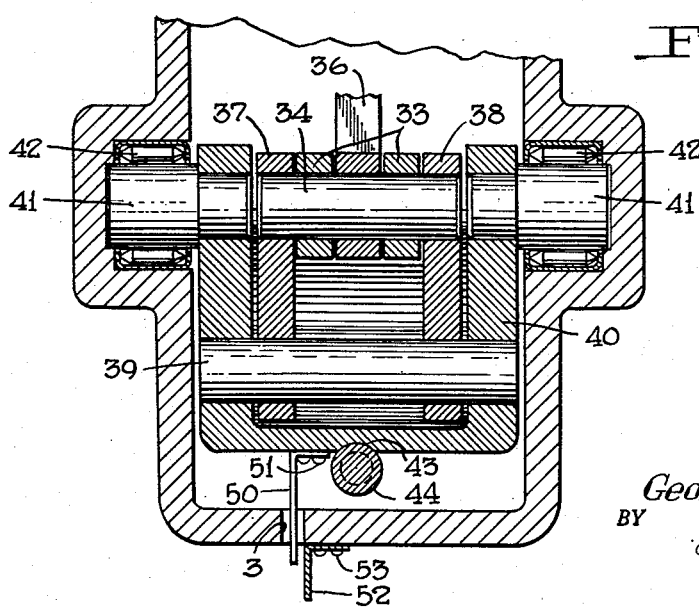
Figure 4:
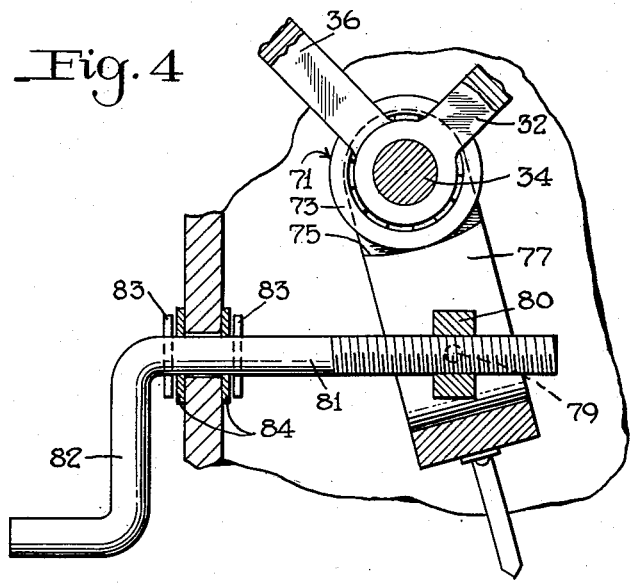
Figure 5:
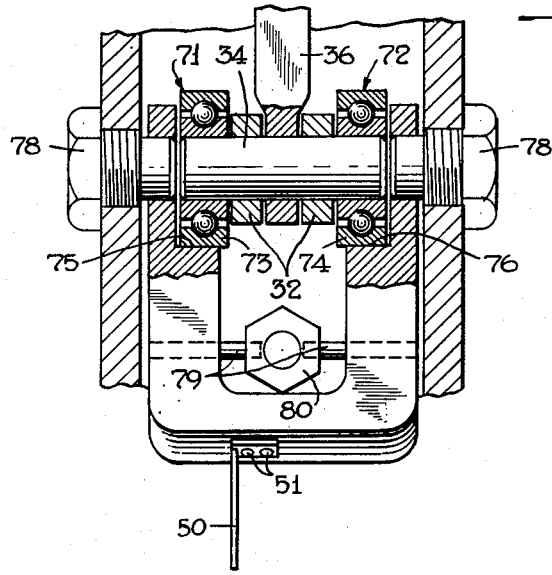
Figure 7:
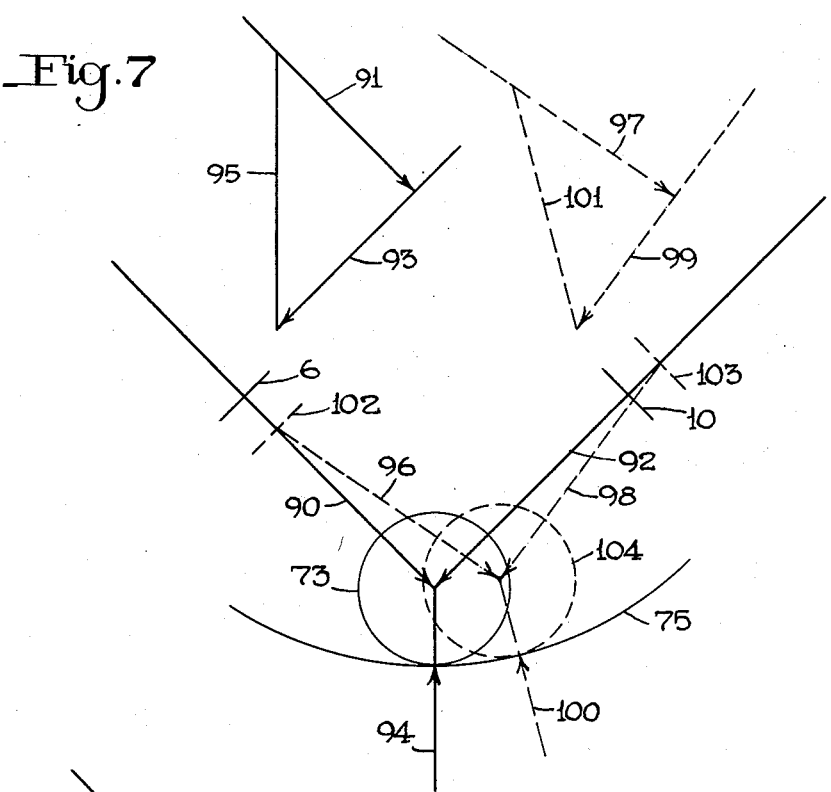

In the accompanying drawings, Fig. 1 is a vertical sectional view of a control mechanism constructed in accordance with one form of the invention; Fig. 2 is a sectional view of a portion of the same taken along the lines 2—2 in Fig. 1; Fig. 3 is a sectional view similar to a portion of Fig. 1 embodying a modification of the invention; Fig. 4 is a sectional view of a modification of the mechanism shown in Fig. 1; Fig. 5 is another view of the embodiment shown in Fig. 4; Fig. 6 is a sectional view of another modification of the mechanism shown in Fig. 1; Fig. 7 is a force diagram for the mechanism shown in

2

Figure 8:
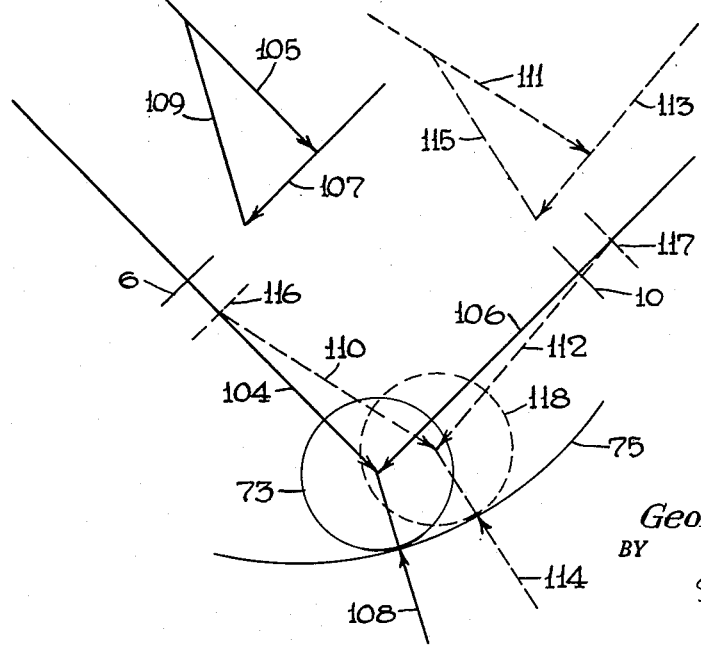

Fig. 4; and, Fig. 8 is a similar diagram with the mechanism shown in Fig. 4 in an adjusted position.

Description—Fig. 1

Referring first to Fig. 1, this embodiment of the improved control mechanism comprises a casing 1 having a central chamber 2, which is open to atmosphere through an opening 3 in the bottom of the casing. The chamber 2 is connected through an opening 4 at one side of the top of the casing 1 to a chamber 5, which chamber is closed at the side opposite to the opening 4 by a diaphragm 6 clamped at its periphery between the casing and a cover section 7. Another chamber 8 is connected through an opening 9 in the top of the casing located at the side of the top opposite to the opening 4, which chamber 8 is closed at its outer end by a diaphragm 10 clamped between the casing and a cover section 11. Defined by diaphragm 6 and cover section 7 is a control chamber 12 which is connected by way of a passage 13 in said cover section to a control pipe 14 leading to a control valve device (not shown). Defined by diaphragm 10 and cover section 11 is a delivery chamber 15, which is always connected by way of a passage 16 in said cover section to a delivery pipe 17 leading to a device to be operated (not shown).

Contained in chamber 8 is a follower 18 for diaphragm 10, which follower has screw-threaded engagement with a nut 19 contained in chamber 15, thereby clamping said diaphragm on its inner periphery. The nut 19 is provided with a through axial passage 20 which connects chamber 15 with atmospheric chamber 2 by way of a port 21 in follower 18. The outer end of the passage 20 is adapted to be closed by a ball-shaped release valve 22 contained in chamber 15 and integrally connected by means of a stem 23 to a ball-shaped supply valve 24 contained in a supply chamber 25. Chamber 25 formed in cover section 11 and closed at its outer end by a cap nut 26, is in constant open communication with a suitable source of supply of fluid under pressure (not shown) by way of a passage 27 and pipe 28, and may communicate with delivery chamber 15 by way of a passage 29 in a bushing 30 mounted by screw-threaded means 31 in cover section 11, passage 29 being adapted to be closed at its outer end by the supply valve 24.

It will be noted that all the parts described in the preceding paragraph are in axial alignment and that upon outward movement of diaphragm 10 from the position in which it is shown in Fig. 1 of the drawings, nut 19 will first engage the release valve 22, closing communication between chamber 15 and passage 20, and then, through the medium of stem 23, actuate supply valve 24 out of engagement with bushing 30, thereby opening passage 29 to chamber 25 to permit flow of fluid under pressure from chamber 25 to chamber 15. The initial part of inward movement of diaphragm 10 from this position in which the supply valve 24 is open will cause said supply valve 24 to engage bushing 30, thereby defining a lap position in which both valves 24 and 22 are seated. Further inward movement of diaphragm 10 will cause nut 19 to unseat valve 22, opening chamber 15 to atmospheric chamber 2 through passage 20 and port 21 and then the various parts just described will again be in the position in which they are shown in Fig. 1.

The follower 18 is provided with an integral coaxial stem 32, which extends through opening 9 into chamber 2 and terminates at its inner end in a clevis 33 (Fig. 2) for rockable mounting on a shaft 34. A similar follower 35 is provided in chamber 5 for diaphragm 6 and has formed integral therewith a coaxial stem 36, which extends through opening 4 into chamber 2, where it is also rockably mounted on shaft 34 within the clevis 33. It is preferred that the stems 32 and 36 be disposed with their axes at an angle of 90 degrees to each other and at angles of 45 degrees from opposite sides of a vertical plane as shown in Fig. 1, in order to obtain the full range of pressure ratios from 0 to 100 per cent as will be explained more fully hereinafter.

An equalizing, or balancing, strut 37 is rockably mounted at one end on shaft 34, outwardly of clevis 33, while a strut 38 is similarly mounted on the opposite end of said shaft for supporting same. The struts 37 and 38 are in turn rockably supported at their opposite, or lower, ends on a shaft 39 intermediate its ends, the ends of shaft 39 being carried in the lower closed portion of a yoke or supporting member 40. The upper open end of yoke 40 is supported at opposite sides of the two struts on respective stub shafts 41, each of which is journaled in one of two opposite inner walls of casing 1 by means of bearings 42, which are in coaxial alignment with shaft 34 and parallel to the axis of shaft 39.

Formed in a portion of the bottom surface of the yoke 40 is a segment 43 of a wormwheel operatively engaging with a screw-threaded worm 44 formed on a shaft 45, which shaft is journaled at one end in a wall of casing 1 and extends through an opening in an opposite wall of the casing to the exterior of the device. The outer end of shaft 45 is provided with a crank handle 46 for manually rotating said shaft and thereby rocking yoke 40 on the stub shafts 41. A snap ring 47 is mounted in a suitable groove 48 in shaft 45 and a friction washer 49 is interposed between said ring and said casing for maintaining said shaft in any selected operating position.

An index pointer 50 is secured by any suitable means, such as rivets 51, to the bottom of yoke 40, whence it extends downwardly through the opening 3 in casing 1 to the exterior thereof. A dial 52 is secured by means of rivets 53 to the bottom of casing 1 adjacent pointer 50 to enable an operator to determine the position of yoke 40 by the position of pointer 50 relative to dial 52.

*Operation—Fig. 1*

Let it be assumed initially that handle 46, shaft 45 and yoke 40 are in the positions in which they are shown in Figs. 1 and 2 of the drawings and that the pilot, or control, chamber 12 is devoid of fluid under pressure while chamber 25 is charged with fluid under pressure supplied from a suitable source (not shown) through pipe 28 and passage 27. Under these conditions the force of fluid pressure in chamber 25 acts on supply valve 24 to effect its closure and, since struts 37 and 38 are rockably mounted on the now stationary yoke 40, the force of gravity acting on and the resilience of the diaphragms 6 and 10 and their respective followers 35 and 18 causes said diaphragm and followers to assume positions of equilibrium, or balance, on said struts, as shown in Fig. 1, in which shafts 34 and 41 are in coaxial alignment. In the position thus assumed the follower nut 19 will be out of seating engagement with release valve 22 and consequently delivery chamber 15, which is open through passage 16 to delivery pipe 17, is connected through passage 20 in nut 19 and port 21 in follower 18 to chamber 2, which chamber is open to atmosphere through opening 3.

If it is now desired to supply fluid under pressure to pipe 17, fluid may be supplied from a control device (not shown) through pipe 14 and passage 13 to pilot chamber 12, wherein it acts on diaphragm 6, causing the diaphragm to exert a force on struts 37 and 38 in a direction for rocking said struts in a clockwise direction about shaft 39, as viewed in Fig. 1. When the increase in fluid pressure in chamber 12 establishes a clockwise torque on struts 37 and 38 becomes sufficient diaphragm 6 deflects inwardly and acting through the medium of follower 35 to rock said struts in a clockwise direction on shaft 39. The initial clockwise rocking of the struts 37, 38 brings the follower nut 19 into sealing engagement with the release valve 22, thereby cutting off the aforementioned connection of chamber 15 with atmosphere and clockwise rocking thereafter acts through the medium of the stem 23 to unseat supply valve 24. Fluid under pressure supplied to chamber 25 is then permitted to flow past valve 24 and through passage 29 to chamber 15, whence it may flow through passages 16 and pipe 17 to a device to be operated (not shown).

When the pressure of fluid supplied to chamber 15, as just described, is increased to a degree at which the force exerted by diaphragm 10 slightly exceeds the opposing force exerted by diaphragm 6 acting through the medium of the follower 35 and shaft 34, diaphragm 10 deflects inwardly, rocking the struts 37, 38 in a counter-clockwise direction, as viewed in Fig. 1, and permitting pressure of fluid in chamber 25 to seat supply valve 24, at which time equilibrium is restored with shaft 34 at center in coaxial alignment with stub shafts 41.

If it is desired to increase the pressure of fluid in pipe 17, fluid under pressure may again be supplied through pipe 14 to chamber 12 to increase the pressure of fluid therein acting on diaphragm 6. The device will then operate in the same manner as above described to cause a corresponding increase in pressure of fluid in chamber 15, passage 16 and pipe 17.

If it is now desired to reduce the pressure of fluid in pipe 17, fluid under pressure is released from chamber 12. When the pressure in chamber 12 acting on diaphragm 6 is thus sufficiently reduced, with respect to the opposing force of pressure of fluid acting on diaphragm 10 in chamber 15, diaphragm 10 deflects further inward rocking shaft 34 counterclockwise about shaft 39 from the position shown carrying follower nut 19 out of engagement with release valve 22 and opening the vent communication past said valve, whereupon fluid under pressure is released from delivery pipe 17 and chamber 15 to atmosphere. When the pressure of fluid in delivery chamber 15 is thus sufficiently reduced with respect to the control pressure of fluid in chamber 12, the latter pressure deflects diaphragm 6 inwardly rocking the shaft 34 clockwise relative to shaft 39 and hence moving the follower nut 19 into seating engagement with release valve 22. At this time shaft 34 is again in coaxial alignment with stub shafts 41.

If it is desired to effect a further reduction in pressure in pipe 17, a further reduction in pressure is effected in chamber 12, and the device will then operate to effect a further reduction in pressure in said pipe in the same manner as above described. Upon a complete release of fluid under pressure from chamber 12, diaphragm 10 will move to and remain in its normal position to allow a complete release of fluid under pressure from pipe 17.

It should here be understood that, while the pressure of fluid obtained in chamber 15 may correspond to the pressure of fluid provided in chamber 12, during operation such as above described, the ratio of the pressure of fluid in chamber 15 to that in chamber 12 may be varied from 100 per cent to zero in a manner about to be described. This ratio may be selected prior to operation of the device or may be varied while the device is in an operative state with little difference in the amount of effort required to effect the change.

Assuming that the device is in lap position and that, as shown in Fig. 1, the axes of the diaphragms 6 and 10 and their respective followers 35 and 18 lie at a fixed angle of 90 degrees from each other, and each being at an angle of 45 degrees from the same vertical plane in which the median lines of the struts 37 and 38 also lie, the ratio between pilot and delivered pressures in chambers 12 and 15, respectively, would be 1 to 1 so that the fluid pressures in chambers 12 and 15 would be substantially the same.

If the operator wishes to obtain delivered fluid in chamber 15 at a pressure which is some particular degree less than the pilot pressure of fluid in control chamber 12, he may rotate shaft 45 by means of crank handle 46 in a direction for rocking the yoke 40 counter-clockwise on the stub shafts 41 and thereby carry the shaft 39 toward the right-hand side of the device, as viewed in Fig. 1. When the shaft 39 is moved toward the right hand from the position in which it is shown in the drawing, the moment arm of the force from the pilot diaphragm 6 is reduced with respect to that of the force from diaphragm 10. If fluid under pressure is present in chambers 12 and 15, and the valves 22, 24 are in lap position, this shifting of shaft 39 toward the right hand will, of course, disturb the state of the previously mentioned equilibrium which exists between the opposing forces acting on diaphragms 6, 10 and struts 37, 38 and thereby give a mechanical advantage to the force acting on diaphragm 10 since the component of the force exerted by diaphragm 10 through stem 32 on said struts in the direction of diaphragm 6 acting on stem is increased by reason of the decrease in angularity between stem 32 and said struts.

As a result of the mechanical advantage just mentioned, diaphragm 10 will deflect inwardly against the pilot pressure on diaphragm 6, rocking the struts 37, 38 counter-clockwise about shaft 39 and carrying follower nut 19 out of seating engagement with release valve 22. Fluid under pressure in chamber 15 will then flow past valve 22 through passage 20 and port 21 into chamber 2, and thence to atmosphere through opening 3 until pressure of fluid in chamber 15 is decreased below that in chamber 12 sufficient to permit diaphragm 6, acting in response to fluid pressure in chamber 12, to rock struts 37, 38 clockwise about shaft 39 to return shaft 34 to the same position of coaxial relationship to stub shafts 41 as that in which it is shown in Fig. 1. In this position, valves 22, 24 will again be seated and the device will be in lap position. Thus, when the shaft 39, struts 37, 38 and yoke 40 are displaced angularly to positions to the right such as those indicated by broken lines 55, 56 and 57, respectively, as viewed in Fig. 1, the pressure of delivered fluid in chamber 15 will be less than the pilot pressure in chamber 12 according to the extent of such displacement. By selecting the proper displacement of shaft 39 it will therefore be seen that the delivered pressure may be less than the pilot pressure to any desired degree.

Now if the operator wishes to obtain fluid in chamber 15 at a pressure which is some particular degree greater than the pilot pressure of fluid in control chamber 12, he may rotate shaft 45 in a direction for rocking yoke 40 in a clockwise direction about shaft 34 and thereby carry shaft 39 toward the left-hand side of the device, as viewed in Fig. 1. In this case the moment arm of the force from the pilot diaphragm 6 is increased with respect to that of the force from diaphragm 10. If fluid under pressure is present in chambers 12 and 15 and valves 22, 24 are in lap position, the mechanical advantage thus given to pilot diaphragm 6 will permit said diaphragm to deflect inwardly against the force on diaphragm 10, rocking struts 37, 38 clockwise about shaft 39 and actuating diaphragm 10 outwardly. Outward movement of diaphragm 10 will unseat supply valve 24, permitting fluid under pressure in supply chamber 25 to flow to chamber 15 until the pressure of fluid in chamber 15, acting on diaphragm 10 is sufficient to overcome the opposing force of diaphragm 6 and then rock struts 37, 38 counter-clockwise about shaft 39 until shaft 34 is returned to the position shown in Fig. 1, in which position valves 22, 24 will again be in lap position. Thus, for any given fluid pressure in chamber 12 the pressure of fluid in chamber 15 may be increased an amount corresponding to the degree of angular displacement of the yoke 40 toward the lefthand side of the device.

With the device in release position in which valve 24 is seated and valve 22 is unseated, the device may be conditioned prior to supplying fluid under pressure to control chamber 12 to operate in a similar manner to supply fluid under pressure to pipe 17 at any selected pressure proportional to the pressure in chamber 12 as governed by the angular displacement of yoke 40, the latter being determined by the position of the pointer 50 on the dial 52, as will be clear from the above description.

Embodiment shown in Fig. 3

The embodiment shown in Fig. 3 provides means whereby equal angular degrees of rotation of an adjusting handle will effect equal degrees of change in the ratio between the pressures in chambers 15 and 12.

In Fig. 3 there is provided a gear segment 60 having gear teeth 61 arranged in an arc having a progressively changing radial length, so that the teeth 61 present in effect a geared cam surface for matching engagement with teeth 62 provided on a pinion gear 63, the teeth 62 being arranged in an arc having radii of varying lengths to complement the lengths of the radii on said gear segment. A handle 64 is rigidly secured by means of a squared shaft 65 to the pinion gear 63.

The change in the ratio of the radius of the pinion gear 63 to the radius of the gear segment 60 is such, as the corresponding teeth progressively engage upon rotation of the handle 64, as to compensate for the inherent deviation of ratio between the pressure in chambers 15 and 12 from a straight-line characteristic as the ratio is changed, so that equal angular increments of rotation of the handle 64 will produce correspondingly equal increments of change in the pressure of fluid in the delivery pipe 17.

*Embodiment shown in Fig. 6*

Instead of employing fluid under pressure in chamber 5 acting in diaphragm 6 to provide a pilot or control force for the device, such force may, as shown in Fig. 6 of the drawings, be established by a spring 66 operatively mounted in a cover section 67 secured to casing 1 in place of cover section 7 shown in Fig. 1. The spring 66 is supported at one end on a follower 68 which is substituted for the follower 35 shown in Fig. 1 and at the opposite end on a spring seat 69 which in turn is supported on an adjusting screw 70 adjustably mounted by screw-thread means in the outer end of the cover section. The rest of the device being the same as that shown in Fig. 1, no further description at this point is deemed necessary.

In operation, when it is desired to increase the pressure of fluid delivered to pipe 17, the adjusting screw 70 may be rotated in a direction for increasing the compression of the spring 66. This action will cause struts 37, 38 to rock in a clockwise direction about the shaft 39, thereby upsetting the normal equilibrium existing between the forces acting on stems 32, 36, as in the device shown in Fig. 1 and causing the supply valve 24 to unseat and deliver fluid under pressure to chamber 15 in pipe 17 until the equilibrium is again restored. With the spring pressure remaining constant the pressure of fluid in chamber 15 may be varied by rotating the yoke 40 about the shaft 34 and varying the proportion relation between the forces acting on stems 32, 36 in the same manner as that described in connection with Fig. 1.

*Embodiment shown in Figs. 4 and 5*

Referring now to the modification shown in Figs. 4 and 5, the lower ends of stems 36 and 32 are mounted on shaft 34 in the same manner as shown in Fig. 1. In this modification, however, ball bearings 71, 72 are mounted on the ends of the shaft 34 and the outer races 73, 74 respectively of said bearings constitute rollers which are adapted to roll on cam surfaces 75, 76, respectively, provided in the upper portions of the respective arms of a yoke 77 corresponding generally to yoke 40 in Fig. 2.

The yoke 77 is rockably mounted at its upper ends on a pair of oppositely arranged studs 78 which are secured in the casing 1 by screw-thread means so as to extend inwardly toward each other and support said yoke. A pair of pins 79 are secured in the lower portions of the respective arms of the yoke and extend inwardly into suitable axially aligned openings in opposite sides of a swiveling nut 80 which is thereby rockably mounted on said pins.

The swiveling nut 80 has screw-threaded connection with a stem 81 rotatably mounted in a horizontal position in the casing 1 and having an integral crank handle 82 located exteriorly of the casing. A pair of pins 83 are secured intermediate their ends in stem 81 at opposite sides of a wall of the casing 1 having an opening 84 through which the stem extends so as to prevent longitudinal shifting of the stem. A pair of washers 84 are interposed between the respective pins 83 and the aforesaid casing wall to reduce friction.

In the operation of the modification shown in Figs. 4 and 5, an inwardly directed force exerted by the stem 36 on the bearings 71 and 72 causes the rollers 73 and 74 to move to the right as viewed in Fig. 4, on the respective surfaces 75 and 76 which, as shown in Fig. 4 are sloped upwardly in the direction of motion. When the force thus exerted by the rollers 73 and 74 on surfaces 75 and 76 of the yoke 77 becomes sufficient to overcome the opposing force of the stem 32 caused by the natural resilient resistance of diaphragm 10, this force causes said rollers to ride over said surfaces to the right (as viewed in Fig. 4) and to move the stem 32 outwardly. In consequence of this outward movement of stem 32, the follower 19, which is positively connected to said stem, operates to seat valve 22 and unseat valve 24 and thus supply fluid under pressure to pipe 17 and chamber 15 in the same manner as previously described.

When the pressure of fluid supplied to chamber 15, as just described, is increased to a degree at which the force of diaphragm 10 exceeds the opposing force exerted by diaphragm 6, diaphragm 10 deflects inwardly, causing rollers 73, 74 to return to a balanced position intermediate the ends of surfaces 75, 76 as shown in Fig. 4, and permitting pressure of fluid in chamber 15 to seat supply valve 24.

If it is desired to increase the pressure of fluid in pipe 17, fluid under pressure may again be supplied through pipe 14 to chamber 12 to increase the pressure therein acting on diaphragm 6. The device will then operate in the same manner as above described to cause a corresponding increase in pressure of fluid in chamber 15, passage 16 and pipe 17.

If it is now desired to reduce the pressure of fluid in pipe 17, fluid under pressure is released from chamber 12. When the pressure in chamber 12 acting on diaphragm 6 is thus sufficiently reduced, with respect to the opposing force of pressure of fluid acting on diaphragm 10, diaphragm 10 deflects further inward, actuating rollers 73, 74 to the left of their balanced positions, as viewed in Fig. 4, carrying follower nut 19 out of engagement with release valve 22 and opening the vent communication past said valve, whereupon fluid under pressure is released from delivery pipe 17 and chamber 15 to atmosphere. When the pressure of fluid is thus sufficiently reduced with respect to the pressure of fluid in control chamber 12, the latter pressure deflects diaphragm 6 inwardly, returning rollers 73, 74 to their balanced positions as shown.

As described in connection with the operation of the embodiment shown in Fig. 1, if the operator wishes to obtain delivered fluid pressure in chamber 15 at a pressure which is some particular degree less than the pilot pressure of fluid in control chamber 12, he may rotate stem 81 by means of crank handle 82 in a direction for rocking the yoke 77 counter-clockwise on the studs 78 thereby increasing the slope of the cam surfaces 75 and 76 relative to the line of action of stem 36. This will, of course, increase the amount of force required to be exerted by the stem 36 to obtain the same corresponding fluid pressure in pipe 17 and chamber 15. If fluid under pressure is present in chambers 12 and 15 and the valves 22, 24 are in lap position, this rocking of the yoke 77 in a counter-clockwise direction will, of course, disturb the state of equilibrium which exists between the opposing forces of stem 36 and stem 32 and thereby give a mechanical advantage to the force acting on diaphragm 10.

As a result of the mechanical advantage just mentioned, diaphragm 10 will deflect inwardly against the pilot pressure on diaphragm 6, causing the same action as that previously described in connection with release of fluid under pressure from chamber 15 to atmosphere.

Now if the operator wishes to obtain a delivered fluid in chamber 15 at a pressure which is some particular degree greater than the pilot pressure of fluid in control chamber 12, he may rotate the handle 82 in the direction for rocking yoke 77 in a clockwise direction about the studs 78, as viewed in Fig. 4. In this case the mechanical advantage of diaphragm 6 is increased with respect to that of the force of diaphragm 10.

If fluid under pressure is present in chambers 12 and 15 and valves 22, 24 are in lap position, the mechanical advantage thus given to the pilot diaphragm 6 will permit said diaphragm to deflect against the force of diaphragm 10, moving the stem 32 and the positively connected follower nut 19 outwardly and thereby seating release valve 22 and unseating supply valve 24. This action of the valves permits fluid under pressure in supply chamber 25 to flow to chamber 15 until the pressure of fluid in chamber 15 acting on diaphragm 10 is sufficient to overcome the opposing force of diaphragm 6 and moves the shaft 34 back to center position and the rollers back to midway position on the cam surfaces 75, 76. Thus, for any given fluid pressure in chamber 12, the pressure of fluid in chamber 15 will be increased an amount corresponding to the degree of angular displacement of the yoke 77 toward the left-hand side of the device.

As in the case of the embodiment shown in Fig. 1, the device shown in Figs. 4 and 5 may therefore be adjusted to provide fluid in pipe 17 at any selected pressure proportional to the pressure of pilot pressure in chamber 12 and as determined by the angular displacement of the yoke 77, indicated by the position of the pointer 50 on the dial 52.

Fig. 7 shows in diagram form the direction and relative magnitude of the three forces when the yoke 77 is in a vertical position, the direction of the control or pilot force exerted by diaphragm 6 on stem 36 being indicated by each of solid lines 90 and 91, the direction of the determinant force exerted against diaphragm 10 being indicated by each of solid lines 92 and 93, and the reactive force exerted by strut 77 being indicated by each of solid lines 94 and 95, respectively, with the device in lap position. For the device in applied position the control force is indicated by each of the broken lines 96 and 97, the determinant force is indicated by each of broken lines 98 and 99, the reactive force by the broken lines 100 and 101, and the displacement of diaphragms by the broken lines 102 and 103, respectively. The position of roller 73 in the same applied position as above is indicated by the broken line 104.

Fig. 8 shows a diagram similar to that in Fig. 7. In this case, however, the surface 75 of yoke 77 is shown as having been rocked in a counter-clockwise direction about the axis of the stud 78 for purposes of comparison as will appear more fully later. In Fig. 8 lines 104 and 105 correspond to lines 90 and 91, respectively, of Fig. 7; lines 106 and 107 correspond to lines 92 and 93, respectively; lines 108 and 109 correspond to lines 94 and 95, respectively; lines 110 and 111 correspond to lines 96 and 97, respectively; lines 112 and 113 correspond to lines 98 and 99, respectively; lines 114 and 115 correspond to lines 100 and 101, respectively; lines 116 and 117 correspond to lines 102 and 103, respectively; and line 118 corresponds to line 104 of Fig. 7.

It should be understood that the displacement of diaphragm 6 and a corresponding displacement of connected roller 73 and diaphragm 10 have been exaggerated over that normally used in the device solely for purposes of better illustration as will appear below. Also, the surface 75 is shown as formed in an arc of a circle having a smaller radius for the same reason.

It will be noted upon referring to Fig. 7 that even with the exaggerations shown the delivery force, indicated at 93 for lap position, operating in opposition to the control force indicated at 91 is substantially the same as the delivery force, indicated at 99 for applied position, operating in opposition to the control force indicated at 97. It should be further noted that the delivery force required to oppose the control force increases as the roller 101 moves from applied position indicated by the broken line 104 to lap position indicated at 73.

The above noted conditions are highly desirable in order that overcasting be prevented upon operation of the roller 73 from its applied position indicated in Fig. 7 by broken line 104 to its lap position, overcasting being that undesirable condition in which the parts of the device, instead of stopping in lap position, continue into release position, thereby reducing the delivery pressure below the proper balancing pressure, whereupon another application is effected and the cycle is repeated. However, as just noted, since the opposing forces in the device shown in Figs. 4 and 5 remain substantially in equilibrium as the parts are operated toward lap position, developing a slight increasing opposition to this movement as the parts approach lap position, it will be apparent from the diaphragms shown in Figs. 7 and 8 that possibilities of overcasting are practically eliminated.

With the yoke 77 disposed in an angular position such as that indicated by line 108 in Fig. 8, it will readily be seen that that portion of line 113 cut off by lines 111 and 115 is less than the corresponding portion of line 99 cut off by lines 97 and 101 in Fig. 7 when the yoke is disposed in a vertical position as in Fig. 7. Thus, the greater the angularity of yoke 77 in a counter-clockwise direction, the less will be the force required to be exerted along line 113 to balance the force exerted along the line 111 and consequently the less will be the pressure of fluid in chamber 15 and pipe 11. Also, the greater the angularity of yoke 77 in a clockwise direction, the greater will be the force required to be exerted along the line 113 to obtain the same result. Furthermore, by comparing the forementioned portion of line 113 with that portion of line 107 cut off by lines 105 and 109 it will be seen that, as the parts move in the direction of lap position, there is a slight increasing opposition developed similar to that pointed out in connection with Fig. 7 in order to preclude the forementioned overcasting.

*Summary*

From the above description it will now be seen that I have provided an improved self-lapping fluid pressure control mechanism adapted to deliver fluid under pressure to a device to be operated. The pressures to be delivered are balanced against and varied with those in a control chamber, the proportion of delivered pressure being determined by one of several forms of a novel mechanism which varies angles of thrust to vary the proportion and is readily and easily adjusted by hand.

Having now described my invention, what I claim as new and desire to secure by Letters Patent, is:

1. A control mechanism comprising in combination, a casing, a support member adjustably mounted at one end in said casing, a strut rockably supported at one end in the other end of said support member, one movable abutment means subject to pressure of fluid in one chamber and pivotally connected to the other end of said strut at a particular angle relative to said strut, another movable abutment means subject to pressure of fluid in another chamber for opposing pressure of fluid in said one chamber, self-lapping valve means directly operable by said other movable abutment means to provide fluid in said other chamber at pressures varying with the variations of fluid pressure in said one chamber, said other movable abutment means being also pivotally connected to said other end of said strut at another particular angle to said strut for balancing against said one movable abutment means, and means for adjusting said support member and thereby said strut relative to both of said movable abutments whereby the angularity of one movable abutment means relative to said strut is varied while the angularity of the other movable abutment means relative to said strut is varied a complementary degree.

2. A control mechanism comprising in combination, one movable abutment means subject to a control pressure and comprising a thrust member, another movable abutment means subject to pressure of fluid in a chamber and comprising a thrust member disposed at a fixed angle to the first mentioned member, self-lapping valve means directly operable by said other movable abutment means in accordance with variations in said control pressure to effect proportional variations in pressure of fluid in said chamber, balancing means comprising a strut having a particular angular relation to the axes of said thrust members in which a particular ratio is established between said forces when balanced and movable to another angular relation to the axes of said thrust members to establish a change from said particular ratio to another ratio when said forces are balanced corresponding to the degree of angular displacement of said strut, and means for actuating said strut from said particular angular relation to said other angular relation.

3. A control mechanism comprising in combination, a link, an adjustable pivot for one end of said link, means for adjusting said pivot, a pair of thrust elements arranged at substantially right angles to each other, pivot means arranged with its axis parallel to that of said adjustable pivot pivotally connecting adjacent ends of said elements to the opposite end of said link, means for applying a control force to one of said thrust elements in a direction toward said pivot means, a movable abutment connected to the other thrust element operable by fluid under pressure in a direction toward said pivot means to oppose the thrust of said one thrust element, and self-lapping valve means directly operable by movement of said movable abutment to provide fluid pressure on said abutment to a sufficient degree to balance the thrust of said first thrust element.

4. A control mechanism comprising, in combination, a fluid pressure supply chamber, a fluid pressure delivery chamber, self-lapping valve means operable to control flow of fluid under pressure from said supply chamber to said delivery chamber, one movable abutment means subject to pressure of fluid in said delivery chamber adapted to engage and operatively control said valve means and comprising a thrust member, a pilot pressure chamber, a second movable abutment means responsive to pressure of fluid in said pilot pressure chamber for actuating said second movable abutment means and comprising a thrust member pivotally connected to the first mentioned thrust member at a certain angle, balancing means comprising a strut having a particular angular relation to the axes of said thrust members in which a particular ratio is established between pressures in said delivery and pilot chambers when balanced and movable to another angular relation to the axes of said thrust members to establish a change from said particular ratio to another ratio corresponding to the degree of angular displacement of said strut, and means for displacing said strut angularly relative to the axes of said thrust members.

References Cited in the file of this patent

UNITED STATES PATENTS

| Number | Name | Date |
|---|---|---|
| 972,689 | Gillespie | Oct. 11, 1910 |
| 1,746,130 | Ruhling | Feb. 4, 1930 |
| 2,088,185 | Borde | July 27, 1937 |
| 2,162,133 | Spire | June 13, 1939 |
| 2,204,530 | Eaton | June 11, 1940 |
| 2,352,312 | Donaldson | June 27, 1944 |
| 2,487,266 | Newell | Nov. 8, 1949 |

FOREIGN PATENTS

| Number | Country | Date |
|---|---|---|
| 756,738 | France | Sept. 25, 1933 |